Figure 1:
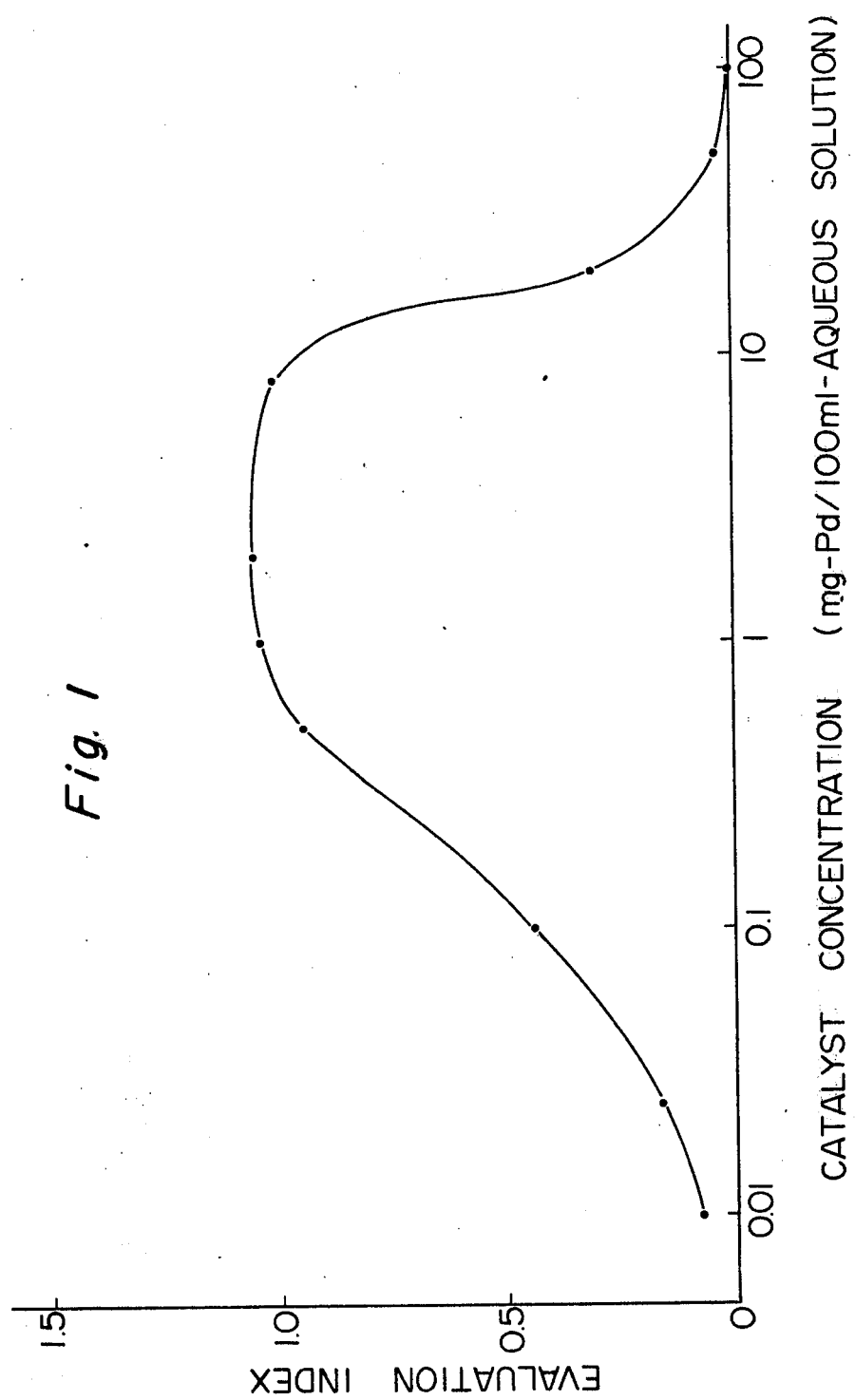

United States Patent [19]

Izumi et al.

[11] 4,009,252

[45] Feb. 22, 1977

[54] PROCESS FOR PREPARING HYDROGEN PEROXIDE

[75] Inventors: Yusuke Izumi, Shinnanyo; Hidetaka Miyazaki; Shin-ichi Kawahara, both of Tokuyama, all of Japan

[73] Assignee: Tokuyama Soda Kabushiki Kaisha, Japan

[22] Filed: June 23, 1975

[21] Appl. No.: 589,776

[30] Foreign Application Priority Data

July 2, 1974 Japan .............................. 49-75040

[52] U.S. Cl. .............................................. 423/584
[51] Int. Cl.² ......................................... C01B 15/02
[58] Field of Search .................................... 423/584

[56] References Cited

UNITED STATES PATENTS

| 1,108,752 | 8/1914 | Henkel et al. | 423/584 |
| 3,336,112 | 8/1967 | Hooper | 423/584 |
| 3,361,533 | 1/1968 | Hooper | 423/584 |

FOREIGN PATENTS OR APPLICATIONS 791,614 8/1968 Canada .............................. 423/584

Primary Examiner—Oscar R. Vertiz
Assistant Examiner—Wayne A. Langel
Attorney, Agent, or Firm—Wenderoth, Lind & Ponack

[57] ABSTRACT

A process for preparing hydrogen peroxide which comprises reacting hydrogen with oxygen in an aqueous medium containing a platinum-group catalyst, characterized in that the partial pressure of hydrogen and the partial pressure of oxygen in the gaseous phase of the reaction system are maintained at at least 0.5 atmosphere and at least 1.0 atmosphere respectively, and the platinum group catalyst is caused to be present in an amount, calculated as metal, of at least a minimum effective catalytic amount up to 30 mg per 100 ml. of said aqueous medium.

9 Claims, 2 Drawing Figures

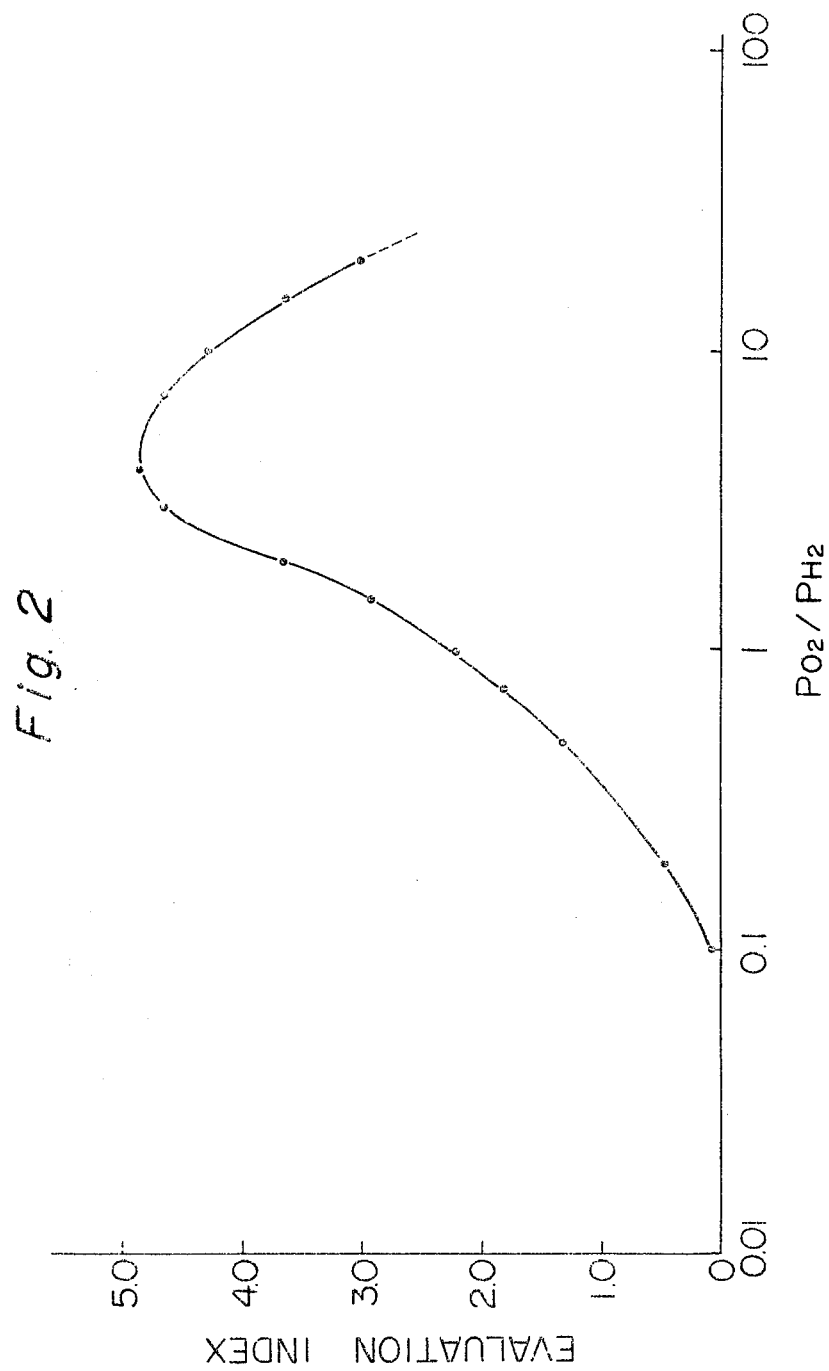

PROCESS FOR PREPARING HYDROGEN PEROXIDE

This invention relates to a process for preparing hydrogen peroxide directly from hydrogen and oxygen, and more specifically, to a process for preparing hydrogen peroxide by a catalytic reaction of hydrogen and oxygen in an aqueous medium containing a platinum-group catalyst under specified conditions.

Conventional industrial processes for preparing hydrogen peroxide generally include, for example, an electrolytic method using acidic ammonium sulfate, an autooxidation method using anthraquinones, and an oxidation method using isopropyl alcohol. On the other hand, various methods have been proposed for synthesizing hydrogen peroxide directly from hydrogen and oxygen, but none of the known direct synthesizing methods have proved satisfactory and gained commercial acceptance.

A method for preparing hydrogen peroxide by a catalytic reaction of hydrogen and oxygen generally at atmospheric pressure in an aqueous medium containing a platinum-group catalyst has been known. But in this known method, the resulting hydrogen peroxide further reacts with hydrogen to decompose to water, and the concentration of the hydrogen peroxide in the aqueous medium of the reaction system is as low as about 0.1% by weight (about 0.05 mol%.). Accordingly, this method can hardly be expected to be commercially feasible.

In an attempt to inhibit the decomposition of hydrogen peroxide prepared from hydrogen and oxygen, a method comprising adding a non-acidic oxygen-containing organic such as acetone or an alcohol to a reaction aqueous solution (Japanese Patent Publication No. 19006/65), or a method comprising adding boric acid ($H_3BO_3$) to the reaction system has been proposed (Japanese Patent Publication No. 8927/68). However, the concentration of hydrogen peroxide obtained is less than about 1.8 by weight in the method of Japanese Patent Publication No. 19006/65, and less than about 3.1 by weight in the method of Japanese Patent Publication No. 8927/68. These methods are still unsatisfactory for commercial operations. Furthermore, in order to obtain hydrogen peroxide in a high concentration by the method of Japanese Patent Publication No. 19006/65, a great quantity of the oxygen-containing organic compound is required. Since this involves the formation and build-up of organic peroxides, the method suffers from an increased danger of explosion.

We furthered our investigations on the method of preparing hydrogen peroxide by a catalytic reaction of hydrogen and oxygen in an aqueous medium containing a platinum-group catalyst, and found that the decomposition of the resulting hydrogen peroxide is markedly affected by the amount of the catalyst present in the aqueous medium. Consequently, we found that hydrogen peroxide can be obtained in a hitherto unobtainable high concentration by using the catalyst in a limited amount and adjusting the partial pressures of hydrogen and oxygen to specific values.

It is an object of this invention to prepare hydrogen peroxide in a high concentration and in a high yield directly from hydrogen and oxygen.

Another object of this invention is to provide a process for preparing hydrogen peroxide which does not given by-products such as organic peroxides that will become a cause of explosion in the reaction system.

Still another object of this invention is to provide a process for preparing hydrogen peroxide with greater industrial advantage.

Other objects of this invention will become apparent from the following description.

According to this invention, there is provided a process for preparing hydrogen peroxide which comprises reacting hydrogen with oxygen in an aqueous medium containing a platinum-group catalyst, characterized in that the partial pressure of hydrogen ($PH_2$) and the partial pressure of oxygen ($PO_2$) in the gaseous phase of the reaction system are maintained at at least 0.5 atmosphere and at least 1.0 atmosphere respectively, and the platinum-group catalyst is caused to be present in an amount, calculated as metal, of at least a minimum effective catalytic amount up to 30 mg per 100 ml. of said aqueous medium.

Preferably, the ratio of the partial pressure of oxygen to that of hydrogen in the gaseous phase of the reaction system ($PO_2/PH_2$) is maintained at 1.5 to 20.

The invention will be described below in greater detail. FIG. 1 is a graphic representation showing the relation between an evaluation index (to be defined hereinbelow) and the concentration of the catalyst; and FIG. 2 is a graphic representation showing the relation between the evaluation index and the ratio of the partial pressure of oxygen to that of hydrogen in the gaseous phase of the reaction system.

The term "reaction system", used in the present specification and claims, denotes a system which includes both an aqueous medium (liquid phase) in which hydrogen peroxide is formed and a gaseous phase which exists in contact with the liquid phase and in which hydrogen and oxygen are present in the gaseous state. Other gases inert to the reaction may be present in the gaseous phase.

It is first essential in the present invention to limit the partial pressure of hydrogen and that of oxygen in the gaseous phase of the reaction system to at least 0.5 atmosphere and at least 1.0 atmosphere, respectively. Hydrogen peroxide can be directly prepared from hydrogen and oxygen even at atmospheric pressure in an aqueous medium containing a platinum-group catalyst. However, since the hydrogen peroxide formed in the aqueous medium simultaneously decomposes, the concentration of hydrogen peroxide actually obtained by a reaction under at atmospheric pressure is extremely low. If, however, the partial pressure of hydrogen and the partial pressure of oxygen in the gaseous phase of the reaction system are adjusted to at least 0.5 atmosphere and at least 1.0 atmosphere respectively, the decomposition of the resulting hydrogen peroxide can be effectively inhibited, and the concentration of hydrogen peroxide actually obtained in the aqueous medium can be increased. It is essential therefore that the sum total of the partial pressure of hydrogen and the partial pressure of oxygen in the gaseous phase of the reaction system should be limited to at least 1.5 atmospheres. In other words, the reaction needs to be carried out at an elevated pressure. Preferably, the partial pressure of hydrogen is 1 to 30 atmospheres, and the partial pressure of oxygen is 2 to 50 atmospheres. Generally, the concentration of hydrogen peroxide in the aqueous medium of the reaction system tends to become higher with larger sum total of the partial pressures of hydrogen and oxygen in the gaseous phase of the reaction system.

It is further essential in the present invention that the platinum-group catalyst should be present in an amount, calculated as metal, of at least an effective catalytic amount up to 30 mg per 100 ml. of the aqueous medium in the reaction system. Generally, in organic synthesis reactions, the amount of the reaction products increases with increasing amounts of catalysts used. However, in the process of this invention for preparing hydrogen peroxide, the concentration of the resulting hydrogen peroxide undergoes a peculiar effect by the amount of the catalyst in the aqueous solution of the reaction system. We unexpectedly found that when the amount of the catalyst exceeds a certain limit, the concentration of the resulting hydrogen peroxide abruptly decreases. This peculiar phenomenon does not occure clearly when the reaction is carried out at atmospheric pressure, because the concentration of hydrogen peroxide is extremely low. But it appears conspicuously when the partial pressures of oxygen and hydrogen are as specified in the present invention. The mechanism of this peculiar phenomenon is not entirely clear, but is ascribed probably to the following cause. When the amount of the catalyst increases, the amount of hydrogen peroxide resulting from hydrogen and oxygen naturally increases. But at the same time the decomposition of the hydrogen peroxide in the reaction system also becomes vigorous, and when the amount of the catalyst exceeds a certain value, the decomposition of hydrogen peroxide becomes predominant over the formation of hydrogen peroxide, which in turn results in a decrease in the concentration of hydrogen peroxide obtained.

Based on the above new finding, we have restricted the upper limit of the amount, calculated as metal, of the platinum-group catalyst to 30 mg per 100 ml. of the aqueous medium. This is one of the characteristic features of the process of this invention. The lower limit of the amount of the catalyst is the minimum of an effective catalytic amount. Generally, the minimum effective catalytic amount is about 0.001 mg calculated as metal per 100 ml. of the aqueous medium. The preferred amount of the catalyst in the process of this invention is 0.01 to 25mg, especially 0.1 to 20 mg, calculated as metal, per 100 ml. of the aqueous medium.

The optimum amount of the catalyst used in the process of this invention is optionally determined according to various conditions such as the type of the catalyst, the reaction temperature or the reaction time. Determination of the optimum amount of the catalyst can be made easily by those skilled in the art.

We have also found that when the partial pressure of hydrogen and the partial pressure of oxygen are maintained at at least 0.5 atmosphere and at least 1.0 atmosphere respectively in the gaseous phase of the reaction system, the concentration of the hydrogen peroxide in the reaction medium can be increased by adjusting the ratio of the partial pressure of oxygen to that of hydrogen ($PO_2/PH_2$) to 1.5–20. When the ratio of the partial pressure of oxygen to that of hydrogen is lower then 1.5, or higher than 20, the concentration of the resulting hydrogen peroxide decreases as compared with the case when this ratio is within the range of 1.5 to 20. More preferably, the ratio of the partial pressure of oxygen to that of hydrogen is maintained at 2.0 to 10.

In the process of this invention, hydrogen and oxygen react catalystically in an aqueous medium containing a platinum-group catalyst to afford hydrogen peroxide directly. The aqueous medium used in this case may be water alone, but is preferably an aqueous solution containing a small amount of an acid such as hydrochloric acid or sulfuric acid. Chlorine ions or cyanogen ions may also be present in it. Conventional stabilizers against iron ions or the like which promote the decomposition of hydrogen peroxide can be used so long as they do not impede the reaction. Examples of suitable stabilizers are phosphoric acids such as metaphosphoric acid, phosphoric acid, pyrophosphoric acid, polyphosphoric acid, hypophosphorous acid and phosphorous acid, and phosphoric acid salts; tin oxide, stannic acid, and salts of these; and sulfuric acid, nitric acid, and salts of these.

The catalyst used in this invention may be any known platinum-group catalysts which have the ability to form hydrogen peroxide directly from hydrogen and oxygen. For example, there can be suitably used solid catalysts containing platinum, palladium or ruthenium as a metal ingredient, or complexes of platinum-group metals. Palladium catalysts containing palladium have especially superior catalytic activity, and are most effective. Their ready availability also makes them most preferable.

The catalyst used in this invention is effective even in the form of a Pd ion as a result of using Pd salts such as $PdCl_2$ or $Pd(NO_3)_2$. Since the catalyst undergoes a reducing action by hydrogen, the catalyst exhibits its action substantially in the form of metal. Accordingly, the catalyst can be used in the form of metal, and generally, it is preferred to use it as supported on a carrier, especially a finely divided carrier, such as silica or alumina. Also complexes of platinum-group metals are those obtained by coordinating phthalocyanine, dipyridyl or dimethyl glyoxime with metals such as platinum, palladium or ruthenium. The catalytic of these organic complexes can be markedly increased by rendering them water-soluble. Accordingly, it is more preferred, for example, to treat a phthalocyanine complex with sulfuric acid thereby to provide a hydrophilic group and render it water-soluble.

In order to perform the process of this invention, a hydrogen gas and an oxygen gas are introduced into an aqueous medium containing a predetermined amount of a platinum-group catalyst. The hydrogen and oxygen gases are controlled in advance so that their partial pressures in the gaseous phase of the reaction system attain the values specified hereinabove. In order to prevent a danger of explosion in the reaction system, it is effective to feed an inert gas such as nitrogen, helium, neon, or argon at the same time. Use of air as the oxygen gas is especially preferred.

The reaction temperature is relative low and generally, the preferred temperature is −10° C. to +50° C.

The aqueous medium containing the catalyst can be prepared with satisfactory results by any conventional methods. It has been found that more preferred results can be obtained if the following methods of preparation are employed.

1. A catalyst-containing aqueous medium is prepared by first adjusting the pH of an aqueous medium to at least 4, adding a platinum-group catalyst to the aqueous medium, and then adjusting the pH of the aqueous medium to less than 4.

2. A catalyst-containing aqueous medium is prepared by adjusting the concentration of oxygen dissolved in an aqueous solution to not more than 1.0 ppm by, for example, introducing a nitrogen, hydrogen or argon gas into the aqueous medium, and then adding a platinum-group catalyst to the aqueous medium. (Water allowed to stand in the atmosphere usually contains about 7 ppm of oxygen dissolved therein.)

3. A catalyst-containing aqueous medium is prepared by introducing hydrogen into an aqueous medium to increase the partial pressure of hydrogen in the gaseous phase of the reaction system to at least 0.03 atmosphere, preferably at least 0.5 atmosphere, and then adding a platinum-group catalyst to the aqueous medium.

When the reaction in accordance with this invention is performed using the catalyst-containing aqueous medium prepared by the above-mentioned methods, the deterioration of the catalytic activity can be prevented, and the concentration and yield of the resulting hydrogen peroxide increase. Accordingly, the use of the these preparing methods is a preferred embodiment of this invention.

When such a method of preparation is employed, a procedure may be taken which comprises placing an aqueous medium in a reactor, subjecting the aqueous medium to the treatment mentioned in any of (1) to (3) above to prepare a catalyst-containing aqueous medium, and then feeding a gaseous feed mixture ($H_2$ gas and $O_2$ gas) to initiate the reaction. An alternative procedure is to prepare a catalyst-containing aqueous medium by the above methods outside the reactor, and then feed it into the reactor to perform the reaction. The latter is especially suitable when the process of this invention is to be performed continuously.

According to the process of this invention, an aqueous solution of hydrogen peroxide in a very high concentration, usually at least 3% by weight (1.6 mol%), and as high as 12.8% by weight (7.2 mol%) under preferred conditions can be obtained directly from hydrogen and oxygen. The resulting hydrogen peroxide aqueous solution can be directly used as an oxidizing agent, or can be concentrated by known methods.

The following Examples illustrate the present invention in greater detail. The actual concentration, yield and evaluation index described in these examples were measured by the following methods.

Actual concentration

The concentration of hydrogen peroxide present in the solution after reaction is measured by a conventional method (using potassium permanganate), and defined as the actual concentration.

Yield

Hydrogen peroxide formed by the reaction of hydrogen with oxygen decomposes in accordance with the following scheme.

$$H_2O_2 + H_2 \rightarrow 2H_2O$$

When it is assumed that the resulting hydrogen peroxide ($H_2O_2$) does not at all decompose, the concentration of the hydrogen peroxide accumulated is designated an assumed concentration. The yield ($\eta$) is defined as follows:

$$\text{Yield } (\eta) = \frac{\text{Actual concentration}}{\text{Assumed concentration}}$$

The yield ($\eta$) is determined as follows:

The total amount of gas absorption of hydrogen and oxygen ($a$ moles) is measured on the basis of hydrogen and oxygen consumed in the formation of hydrogen peroxide and hydrogen consumed in the decomposition of the hydrogen peroxide. On the other hand, from the actual concentration, the amount of hydrogen peroxide present in the reaction solution ($b$ moles) is calculated. Then, the yield ($\eta$) is calculated by the following equation.

$$\eta = \frac{3 \times \frac{b}{a}}{1 + \frac{b}{a}}$$

The measurement of the amount of gas absorption is determined by sealing the reaction system temporarily, measuring the rate of absorption from the rate of pressure drop, and integrating the measured absorption rate by the time.

Evaluation index

Higher yields and higher actual concentrations of hydrogen peroxide resulting in the present invention are more desirable commercially. Accordingly, the product of the yield and the actual concentration is calculated and used as an index to evaluate the formation of hydrogen peroxide.

EXAMPLE 1

A catalyst comprising 5% by weight of metallic palladium supported on a hydrous silicic acid carrier was prepared in the following way.

Finely divided hydrous silicic acid (TOKUSIL-GU, registered trademark for a product of Tokuyama Soda Kabushiki Kaisha) was washed with conc. hydrochloric acid, washed with water, and dried. The dried product was added to a solution of a predetermined amount of palladium chloride ($PdCl_2$) in 4-N-hydrochloric acid, and they were mixed. The mixture was evaporated to dryness on a hot water bath, dried in a stream of nitrogen at 150° C. for 2 hours, and then pulverized. Then, the pulverized product was reduced in a hydrogen atmosphere at 400° C. for 3 hours to prepare the catalyst.

A 300 ml. autoclave-type reactor with a glass lining inside and a stirrer was charged with 50 ml. of pure deionized water. While introducing a nitrogen gas into the water, 10 mg of the catalyst prepared was added with stirring. (The amount of the catalyst corresponded to 1 mg as metallic palladium based on 100 ml. of the aqueous medium in the reaction system). Furthermore, hydrochloric acid and sulfuric acid were added to a concentration of 0.03 N and 1N respectively.

With stirring, a hydrogen gas and an oxygen gas were passed into the reactor, and while maintaining the partial pressure of hydrogen ($PH_2$) and the partial pressure of oxygen ($PO_2$) in the gaseous phase of the reaction system at each of the values shown in Table 1, hydrogen and oxygen were reacted at 30° C. for 20 hours. The results obtained are shown in Table 1.

Table 1

| Run No. | Total pressure PH$_2$ + PO$_2$ (atm) | PO$_2$ (atm) | PH$_2$ (atm) | PO$_2$/PH$_2$ | Actual Concentration (mol %) | Yield | Evaluation index |
| --- | --- | --- | --- | --- | --- | --- | --- |
| 1 | 1.0 | 0.71 | 0.29 | 2.5 | 0.415 | 0.303 | 0.126 |
| 2 | 1.5 | 1.2 | 0.3 | 4.0 | 0.420 | 0.351 | 0.147 |
| 3 | 1.5 | 0.5 | 1.0 | 0.5 | 0.251 | 0.147 | 0.037 |
| 4 | 1.5 | 1.0 | 0.5 | 2.0 | 0.734 | 0.352 | 0.258 |
| 5 | 3.0 | 2.14 | 0.86 | 2.5 | 1.85 | 0.547 | 1.01 |
| 6 | 5.0 | 3.55 | 1.45 | 2.5 | 3.02 | 0.662 | 2.00 |
| 7 | 10.0 | 7.1 | 2.9 | 2.5 | 4.87 | 0.792 | 3.86 |
| 8 | 20.0 | 14.2 | 5.8 | 2.5 | 6.59 | 0.880 | 5.80 |

It can be seen from the results shown in Table 1 that in Runs Nos. 1 to 3 in which the partial pressures of oxygen and hydrogen do not fall within the ranges specified in the present invention, no satisfactory result can be obtained. Table 1 also shows that with higher total pressures, better results tend to be obtained.

EXAMPLE 2

An aqueous solution containing a palladium catalyst was prepared in the same way as in Example 1, and the same reaction as in Example 1 was performed except that a hydrogen gas, an oxygen gas and a nitrogen gas were passed into the reactor, and the partial pressure of hydrogen and the partial pressure of oxygen were maintained at 2.86 atmospheres and 7.16 atmospheres respectively (the ratio of the partial pressure of oxygen to that of hydrogen was 2.5), and the partial pressure of nitrogen was maintained at 62 atmospheres.

As a result, the actual concentration of the hydrogen peroxide obtained was 5.44 mole %, and its yield was 0.892. The valuation index was 4.85.

EXAMPLE 3

The same reaction as in Example 1 was performed for 40 hours except that the partial pressures of hydrogen and oxygen in the gaseous phase of the reaction system were maintained at 1 and 2 atmospheres respectively, and the amount, as palladium metal, of the palladium catalyst in the aqueous solution of the reaction system was varied as shown in Table 2. The results are shown in Table 2 and FIG. 1.

Table 2

| Run No. | Concentration of catalyst (mg/100ml.) | Actual concentration (mol%) | Yield | Evaluation index |
| --- | --- | --- | --- | --- |
| 1 | 0.01 | 0.083 | 0.905 | 0.0751 |
| 2 | 0.025 | 0.190 | 0.860 | 0.163 |
| 3 | 0.1 | 0.596 | 0.737 | 0.440 |
| 4 | 0.5 | 1.82 | 0.52 | 0.946 |
| 5 | 1 | 2.59 | 0.402 | 1.04 |
| 6 | 2 | 3.48 | 0.302 | 1.05 |
| 7 | 8 | 3.62 | 0.279 | 1.01 |
| 8 | 20 | 2.20 | 0.139 | 0.306 |
| 9 | 50 | 0.77 | 0.0445 | 0.0343 |
| 10 | 100 | 0.36 | 0.0193 | 0.0070 |

It is clear from the above experimental results that when the amount of the catalyst exceeds a certain limit, both the actual concentration and the yield of hydrogen peroxide decrease.

EXAMPLE 4

The same reactions as in No. 3 (the catalyst concentration, 0.1 mg/100 ml.) and No. 10 (the catalyst concentration, 100 mg/100 ml.) in Example 3 were carried out except that the reaction time was changed from 40 hours to 400 hours. The results obtained were as tabulated below.

| Catalyst concentration (mg/100 ml.) | Actual concentration (mole%) | Yield | Evaluation index |
| --- | --- | --- | --- |
| 0.1 | 2.31 | 0.41 | 0.947 |
| 100 | 0.33 | 0.00176 | 0.00058 |

EXAMPLE 5

The same reaction as in Example 1 was repeated except that the ratio of the partial pressure of oxygen to that of hydrogen was varied as shown in Table 3 while maintaining the total pressure (PH$_2$ + PO$_2$) was maintained at 12 atmospheres.

The results are shown in Table 3 and FIG. 2.

Table 3

| Run No. | Total pressure PH$_2$+PO$_2$ (atm) | PO$_2$ (atm) | PH$_2$ (atm) | PO$_2$/PH$_2$ | Actual concentration (mol %) | Yield | Evaluation index |
| --- | --- | --- | --- | --- | --- | --- | --- |
| 1 | 12 | 1.1 | 10.9 | 0.1 | 0.37 | 0.352 | 0.130 |
| 2 | 12 | 2.0 | 10.0 | 0.2 | 1.02 | 0.476 | 0.486 |
| 3 | 12 | 4.0 | 8.0 | 0.5 | 2.18 | 0.613 | 1.34 |

Table 3-continued

| Run No. | Total pressure PH₂+PO₂ (atm) | PO₂ (atm) | PH₂ (atm) | PO₂/PH₂ | Actual concenration (mol %) | Yield | Evaluation index |
|---|---|---|---|---|---|---|---|
| 4 | 12 | 5.1 | 6.9 | 0.75 | 2.68 | 0.680 | 1.82 |
| 5 | 12 | 6.0 | 6.0 | 1.0 | 3.12 | 0.721 | 2.25 |
| 6 | 12 | 7.2 | 4.8 | 1.5 | 3.83 | 0.765 | 2.93 |
| 7 | 12 | 8.0 | 4.0 | 2.0 | 4.65 | 0.790 | 3.67 |
| 8 | 12 | 9.0 | 3.0 | 3.0 | 5.72 | 0.815 | 4.66 |
| 9 | 12 | 9.6 | 2.4 | 4.0 | 5.85 | 0.832 | 4.87 |
| 10 | 12 | 10.5 | 1.5 | 7.0 | 5.50 | 0.842 | 4.65 |
| 11 | 12 | 10.9 | 1.1 | 10.0 | 5.07 | 0.852 | 4.32 |
| 12 | 12 | 11.25 | 0.75 | 15.0 | 4.22 | 0.864 | 3.65 |
| 13 | 12 | 11.43 | 0.57 | 20.0 | 3.50 | 0.866 | 3.03 |

The above experimental results demonstrate that better results can be obtained when the ratio of the partial pressure of oxygen to that of hydrogen is maintained at 1.5 to 20.

EXAMPLE 6

The same reaction as in Example 1 was repeated except that the partial pressures of hydrogen and oxygen in the gaseous phase of the reaction system were changed as shown in Table 4. The results are also shown in Table 4.

Table 4

| Run No. | Total pressure (atm) | PO₂ (atm) | PH₂ (atm) | PO₂/PH₂ | Actual concentration (mol%) | Yield | Evaluation index |
|---|---|---|---|---|---|---|---|
| 1 | 60 | 40 | 20 | 2 | 6.82 | 0.85 | 5.80 |
| 2 | 55 | 40 | 15 | 3 | 7.23 | 0.88 | 6.36 |
| 3 | 25 | 20 | 5 | 4 | 7.10 | 0.87 | 6.18 |
| 1 | 45 | 40 | 5 | 8 | 6.64 | 0.89 | 5.94 |

EXAMPLE 7

In this Example, various organic complexes of palladium were used as a catalyst without supporting them on a carrier.

The same reactor as used in Example 1 was charged with 200 ml. of pure water, and 1 mg, calculated as palladium metal, of each of the organic complexes shown in Table 5 was added at a temperature of 30° C. in an atmosphere of nitrogen. Hydrochloric acid was added to the resulting catalyst aqueous medium to adjust its pH to 1.5. Hydrogen gas and oxygen gas were introduced into the reactor with stirring while maintaining the temperature at 30° C. While maintaining the partial pressures of hydrogen and oxygen in the gaseous phase of the reaction system at 1.0 and 4.0 atmospheres, respectively and the total pressure at 5 atmospheres, hydrogen was reacted with oxygen for 2 hours at 30° C.

The actural concentration of the hydrogen peroxide obtained is shown in Table 5 for each organic complex catalyst.

Table 5

| Run No. | Organic complex | Actual concentration (mol%) |
|---|---|---|
| 1 | Phthalocyanine palladium | 0.112 |
| 2 | 4,4',4'',4'''-tetrasulfonated phthalocyanine palladium | 0.204 |
| 3 | bis(triphenyl- | 0.109 |

Table 5-continued

| Run No. | Organic complex | Actual concentration (mol%) |
|---|---|---|
| | phosphine) palladium dichloride | |
| 4 | Dipyridyl palladium dichloride | 0.022 |

EXAMPLE 8

A platinum-type catalyst was prepared in the same way as in Example 1 except that chloroplatinic acid (H₂PtCl₆.6H₂O) was used instead of the pallaium chloride.

The same reaction as in Example 3 was performed using 1 mg, calculated as metal, per 100 ml. of the aqueous solution of the reaction system, of the catalyst so prepared. The actual concentration of the hydrogen peroxide obtained was 0.12 mol% and its yield was 0.02. The evaluation index was 0.0024.

EXAMPLE 9

The same reactor as used in Example 1 was charged with 100 ml. of an aqueous solution adjusted with hydrochloric acid to a predetermined pH as shown in Table 6, and 0.2 mg, calculated as metal, of the same palladium catalyst as used in Example 1 was added.

Then, hydrochloric acid was added to the catalyst-containing aqueous solution to adjust its pH to 1.5. Hydrogen gas and oxygen gas were introduced, and were reacted at 30° C for 10 hours with stirring while maintaining the partial pressures of hydrogen and oxygen at 0.7 and 1.2 atmospheres, respectively.

The results are shown in Table 6.

Table 6

| Run No. | pH of the aqueous Solution before addition of the catalyst | Results Actual concentration (mol%) | Yield | Evaluation index |
|---|---|---|---|---|
| 1 | 6.5 | 0.240 | 0.500 | 0.120 |
| 2 | 4.0 | 0.238 | 0.477 | 0.114 |
| 3 | 2.0 | 0.205 | 0.425 | 0.087 |
| 4 | 1.6 | 0.183 | 0.401 | 0.073 |

EXAMPLE 10

The same reactor as used in Example 1 was charged with 100 ml. of pure water. Then, a nitrogen gas was passed into the reactor, and the amount of oxygen dissolved in the aqueous solution was adjusted as shown in Table 7. Then, 4 mg of the same catalyst as used in Example 1 (corresponding to 0.2 mg calculated as metal per 100 ml. of the aqueous medium of the reaction system) was added. Hydrogen gas was passed into the reactor, and the reaction system was stirred.

Then, hydrochloric acid was added to the catalyst-containing aqueous solution, and the concentration was adjusted to PH 1.5. Hydrogen gas and oxygen gas were introduced, and reacted at 30° C. for 10 hours with stirring while maintaining the partial pressures of hydrogen and oxygen in the gaseous phase of the reaction system at 0.7 and 1.2 atmospheres, respectively.

The results obtained are shown in Table 7.

Table 7

| Run No. | Concentration of oxygen dissolved (ppm) | Actual concentration (mol%) | Yield | Evaluation index |
| --- | --- | --- | --- | --- |
| 1 | 7.0 | 0.241 | 0.502 | 0.121 |
| 2 | 5.6 | 0.258 | 0.537 | 0.139 |
| 3 | 1.0 | 0.311 | 0.728 | 0.226 |
| 4 | 0.58 | 0.310 | 0.725 | 0.225 |
| 5 | 0.11 | 0.312 | 0.730 | 0.228 |
| 6 | 0 | 0.311 | 0.732 | 0.228 |

EXAMPLE 11

100 ml. of an aqueous solution containing 0.1 mol % of hydrogen peroxide was fed into the same reaction as used in Example 1, and then with stirring, a hydrogen gas was introduced, and maintained at the partial pressure indicated in Table 8. Then, the same palladium catalyst as used in Example 1 was added to the aqueous solution in an amount, calculated as palladium metal, of 0.2 mg per 100 ml. of the aqueous solution. Then, hydrochloric acid was added to the catalyst-containing aqueous solution to adjust its pH to 1.5. A hydrogen gas and an oxygen gas were introduced into the reactor, and reacted at 30° C for 10 hours while maintaining the partial pressures of hydrogen and oxygen in the gaseous phase of the reaction system at 0.7 and 1.2 atmospheres, respectively.

The results are shown in Table 8.

Table 8

| Run No. | Partial pressure of hydrogen (atms) | Actual concentration of hydrogen peroxide (mol%) |
| --- | --- | --- |
| 1 | 1 | 0.372 |
| 2 | 0.5 | 0.370 |
| 3 | 0.03 | 0.311 |

Table 8-continued

| Run No. | Partial pressure of hydrogen (atms) | Actual concentration of hydrogen peroxide (mol%) |
| --- | --- | --- |
| 4 | 0.01 | 0.252 |
| 5 | 0 | 0.103 |

What we claim is:

1. A process for preparing hydrogen peroxide which comprises reacting hydrogen with oxygen in an aqueous medium containing a platinum-group catalyst, characterized in that the partial pressure of hydrogen and the partial pressure of oxygen in the gaseous phase of the reaction system are maintained at at least 0.5 atmosphere and at least 1.0 atmosphere respectively, and in that the ratio of the partial pressure of oxygen to that of hydrogen in the gaseous phase of the reaction system is maintained within the range of 1.5 to 20, and the platinum group catalyst is caused to be present in an amount, calculated as metal, of at least a minimum effective catalyst amount up to 30 mg per 100 ml. of said aqueous medium.

2. The process of claim 1 wherein said platinum-group catalyst is selected from the group consisting of palladium-catalysts, platinum-catalysts and ruthenium-catalysts.

3. The process of claim 2 wherein said platinum-group catalyst is a palladium-catalyst.

4. The process of claim 1 wherein the amount of said platinum-group catalyst is 0.01 to 25 mg, calculated as metal, per 100 ml. of said aqueous medium.

5. The process of claim 4 wherein the amount of the platinum-group catalyst is 0.1 to 20 mg, calculated as metal, per 100 ml. of said aqueous medium.

6. The process of claim 1 wherein said ratio is within the range of 2.0 to 15.

7. The process of claim 1 wherein the pH of said aqueous medium is adjusted to at least 4, then said platinum-group catalyst is added to the aqueous medium, and the pH of the aqueous medium is adjusted to less than 4 thereby to prepare an aqueous medium containing the catalyst.

8. The process of claim 1 wherein the concentration of oxygen dissolved in said aqueous medium is adjusted to not more than 1.0 ppm, and then said platinum-group catalyst is added to the aqueous medium thereby to form an aqueous medium containing the catalyst.

9. The process of claim 1 wherein hydrogen is introduced into said aqueous medium, and when the partial pressure of hydrogen in the gaseous phase of the reaction system reaches at least 0.03 atmosphere, the platinum-group catalyst is added to the aqueous medium thereby to form an aqueous medium containing the catalyst.

* * * * *